(12) United States Patent
Xiao et al.

(10) Patent No.: US 10,431,991 B2
(45) Date of Patent: Oct. 1, 2019

(54) TUNING IN A WIRELESS POWER TRANSMITTER

(71) Applicant: Intel Corporation, Santa Clara, CA (US)

(72) Inventors: Bin Xiao, San Ramon, CA (US); Songnan Yang, San Jose, CA (US); Xintian E. Lin, Mountain View, CA (US); Lei Shao, Sunnyvale, CA (US); Jie Chen, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 756 days.

(21) Appl. No.: 14/863,139

(22) Filed: Sep. 23, 2015

(65) Prior Publication Data

US 2017/0085097 A1  Mar. 23, 2017

(51) Int. Cl.
  *H02J 5/00*  (2016.01)
  *H02J 7/02*  (2016.01)

(52) U.S. Cl.
  CPC .............. *H02J 5/005* (2013.01); *H02J 7/025* (2013.01)

(58) Field of Classification Search
  CPC .................................. H02J 5/005; H02J 7/025
  See application file for complete search history.

(56) References Cited

U.S. PATENT DOCUMENTS

| | | | |
|---|---|---|---|
| 8,532,724 B2 | 9/2013 | Cook et al. | |
| 2003/0227340 A1 | 12/2003 | Koo et al. | |
| 2009/0134949 A1* | 5/2009 | He | H03H 7/40 333/17.3 |
| 2010/0011745 A1 | 5/2010 | Karalis et al. | |
| 2010/0109445 A1* | 5/2010 | Kurs | B60L 11/007 307/104 |
| 2011/0278945 A1 | 11/2011 | Wheatley, III et al. | |
| 2013/0076306 A1* | 3/2013 | Lee | H02J 7/025 320/108 |
| 2014/0015327 A1 | 1/2014 | Keeling et al. | |
| 2014/0159500 A1* | 6/2014 | Sankar | H02J 50/12 307/104 |
| 2016/0013657 A1* | 1/2016 | Jeong | H02J 7/0044 307/104 |

FOREIGN PATENT DOCUMENTS

| | | |
|---|---|---|
| CN | 1669222 A | 9/2005 |
| CN | 102150340 A | 8/2011 |
| CN | 102893532 A | 1/2013 |
| CN | 1004471821 A | 3/2015 |

OTHER PUBLICATIONS

Chinese Search Report from related Chinese Patent Application No. 201610705817.8 dated Sep. 28, 2018.

* cited by examiner

*Primary Examiner* — Jeffrey M Shin
(74) *Attorney, Agent, or Firm* — International IP Law Group, P.L.L.C.

(57) ABSTRACT

Techniques for tuning in a wireless power transmitter in a system, method, and apparatus are described herein. For example, an apparatus may include a transmitter coil configured to generate a magnetic field. The apparatus may also include a set of capacitors in series with the transmitter coil, wherein a capacitance value for each of capacitors in the set is associated with a reactance shift.

22 Claims, 6 Drawing Sheets

200

300

400

600

TUNING IN A WIRELESS POWER TRANSMITTER

TECHNICAL FIELD

This disclosure relates generally to techniques for wireless charging. Specifically, this disclosure relates to tuning a wireless power transmitter.

BACKGROUND ART

A basic wireless charging system may include a wireless power transmitter unit (PTU) and a wireless power receiving unit (PRU). For example, a PTU may include a transmit (Tx) coil, and a PRU may include receive (Rx) coil. Magnetic resonance wireless charging may employ a magnetic coupling between the Tx coil and the Rx coil. In some cases, a PRU is implemented in a device having various size chassis. In some cases, constant current supply design may include providing a constant current source even when various size chassis change a resonant frequency of magnetic coupling between the PRU and the PTU.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE ASPECTS

The present disclosure relates generally to techniques for wireless charging. Specifically, the techniques described herein include an apparatus in a wireless power transmitting unit (PTU) having a transmit (Tx) coil configured to generate a magnetic field. The apparatus may also include a set of series capacitors in series with the transmitter coil. A capacitance value for each of the series capacitors in the set is associated with a reactance shift.

As discussed above, in some cases, constant current supply design may include providing a constant current source even while various size chassis may change a resonant frequency of magnetic coupling between a wireless power receiving unit (PRU) and the PTU. For example, a mobile computing device having a PRU may have a relatively smaller metal chassis when compared to a laptop computing device. When a computing device having a relatively larger metal chassis is placed on a wireless charging device having a PTU, a reduction of PTU coil inductance may occur as an eddy current induced on the metal chassis cancels part of the magnetic field generated by PTU, causing a detuning, or reactance shift from the resonant frequency. The techniques described herein include in series capacitors configured to generate a reactance shift to retune the magnetic coupling between the PTU and PRU to a resonant frequency. The series capacitors are configured to have a substantially uniform reactance shift based on the capacitive values of each series capacitor in a set of series capacitors.

In some cases, the techniques discussed herein may be implemented using a wireless charging standard protocol, such as the specification provided by Alliance For Wireless Power (A4WP) version 1.3, Nov. 5, 2014. A wireless power receiving (Rx) coil may be a component in a power receiving unit (PRU), while a wireless power transmission (Tx) coil may be a component in a power transmitting unit (PTU), as discussed in more detail below. However, the techniques described herein may be implemented using any other wireless charging standard protocol where applicable.

Figure 1:
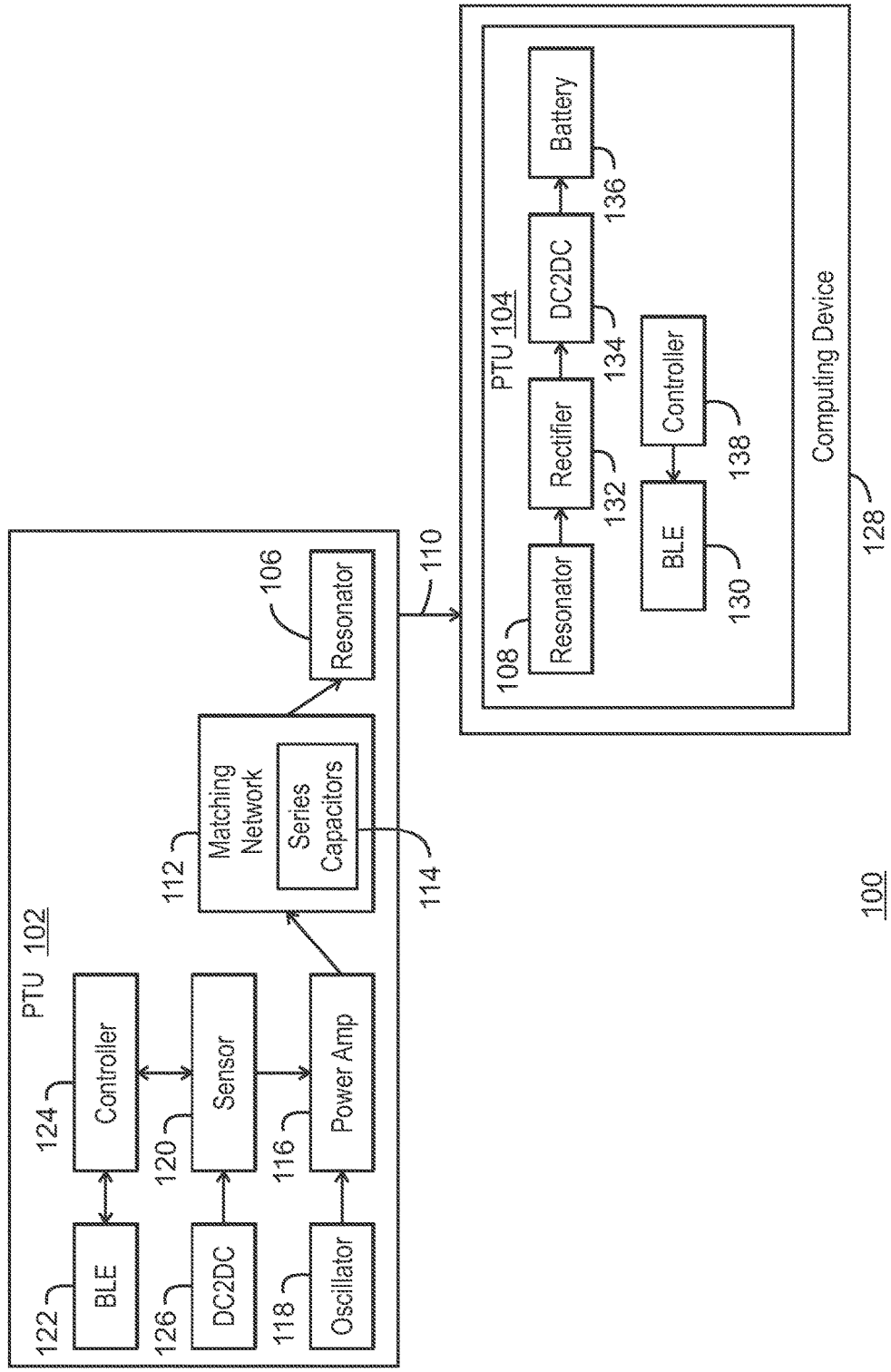
FIG. 1 is block diagram of a PTU to provide power to a PRU, wherein the PTU includes series capacitors configured to tune the PTU.

FIG. 1 is block diagram of a PTU to provide power to a PRU, wherein the PTU includes series capacitors configured to tune the PTU. A PTU 102 may couple to a PRU 104 via magnetic inductive coupling between resonators 106, and 108, as indicated by the arrow 110. The PRU 104 may be a component of a computing device 111 configured to receive charge by the inductive coupling 110. The resonator 106 may be referred to herein as a Tx coil 106 of the PTU 102. The resonator 108 may be referred to herein as a Rx coil 108 of the PRU 104.

As illustrated in FIG. 1, the PTU 102 may include a matching network 112 configured to match the amplified oscillation provided to the resonator 106 of the PTU 102. The matching network 112 may also include series capacitors 114. The series capacitors 114 may be configured to switch on and off using relays, such as solid state relays discussed in more detail below in regard to FIG. 3. The operation of the series capacitors 114 may generate a reactance shift to compensate for detuning of the magnetic inductive coupling 110. The nature of the series capacitors 114 may be such that reactance shifts generated by one or more of the series capacitors 114 may be substantially uniform. In other words, step sizes for reactance shifts to retune the magnetic inductive coupling 110 back to resonance may be substantially the same based on the configuration of the series capacitors 114. The series capacitors 114 may be configured as an integrated component of the PTU, such as a component of a matching network 112, as a separate component, or as an integrated component any other component of the PTU 102, or any combination thereof.

Other components of the PTU may include a power amplifier 116, and oscillator 118, a current sensor 120, a Bluetooth Low Energy (BLE) module 122, a controller 124, direct current to direct current (DC2DC) converter 126, and the like. The current sensor 120 may be an ampere meter, a volt meter, or any other sensor configured to sense load variations occurring due to inductive coupling between the PTU 102 and another object, such as the PRU 104. The current sensor 120 may provide an indication of load change to the controller 140 of the PTU 102. The controller 140 may power on the power amplifier 116 configured to receive direct current (DC) from the DC2DC converter 126, and to amplify and oscillate the current. The oscillator 118 may be configured to oscillate the power provided at a given frequency.

In some cases, a wireless handshake between the PTU 102 and the PRU 104 may indicate a size category of a computing device 128 having the Rx coil 108. The size category may provide an indication of an expected detuning based on metal components in the computing device 128 that may cause a detuning. In some cases, the wireless handshake is performed by the BLE module 122 of the PTU 102 and a BLE module 130 of the PRU 104. In the A4WP standard, the wireless handshake may indicate a size category of the PRU 104 having a predefined reactance shift detected at the matching network 112. However, in some cases, a larger chassis of the computing device 111 may interact with the inductive coupling 110 via interference with the magnetic field flux generating the inductive coupling 110. In this case, a reactance shift above a predefined threshold may be detected by the sensor 120. Upon detection of the reactance shift above the predefined threshold, the series capacitors 114 may be configured to retune the magnetic inductive coupling 110 to a resonant frequency based on a substantially uniform step size, as discussed in more detail below in regard to FIG. 2.

In FIG. 1, inductive coupling may occur between the Tx coil 106 and the Rx coil 108, and as a magnetic flux associated with the inductive coupling passes through the Rx coil 108 the computing device 111 may receive power. A rectifier 132 may receive voltage having an alternating current (AC) from the Rx coil 108 and may be configured to generate a rectified voltage (Vrect) having a direct current (DC). As illustrated in FIG. 1, a DC2DC converter 134 may provide a DC output to a battery 136.

The PRU 104 may also include a controller 138 configured to initiate a wireless broadcast having wireless handshake data. As discussed above, the wireless handshake broadcast may be carried out by a wireless data transmission component such as BLE module 130.

The block diagram of FIG. 1 is not intended to indicate that the PTU 102 and/or the PRU 104 are to include all of the components shown in FIG. 1. Further, the PTU 102 and/or the PRU 104 may include any number of additional components not shown in FIG. 1, depending on the details of the specific implementation.

Figure 2:
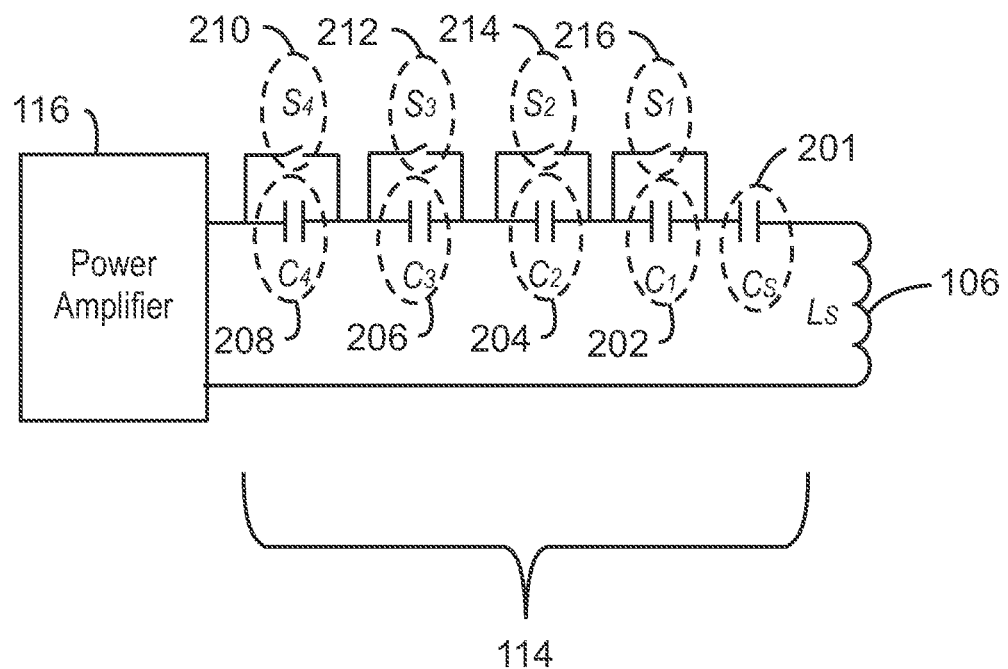
FIG. 2 is a diagram illustrating series capacitors configured to tune a magnetic coupling of a transmitter coil.

FIG. 2 is a diagram illustrating series capacitors configured to tune a magnetic coupling of a transmitter coil. The diagram 200 may be referred to as tuning circuit 200. As discussed above in regard to FIG. 1, series capacitors 114 may be in series with the Tx coil 106. In some cases, the series capacitors 114 may be understood as being in series with a series capacitor 201 associated with normal operation of the transmitter coil 106. As illustrated in FIG. 2, the series capacitors 114 may include a first series capacitor 202, a second series capacitors 204, a third series capacitor 206, and a fourth series capacitor 208. Each series capacitor may be switched on and off by a corresponding switch 210, 212, 214, and 216. As illustrated in FIG. 2, each switch 210, 212, 214, and 1216 is parallel to a corresponding series capacitor 202, 204, 206, 208.

In an initial state, all the switches 210, 212, 214, and 216 may be off (i.e. open circuit). If a computing device, such as the computing device 128 of FIG. 1, having metal components is placed on a PTU, such as the PTU 102 of FIG. 1, the metal components may reduce an inductance of the magnetic coupling 110 that may otherwise occur if the computing device 128 included a smaller amount of metal components or metal material. As the inductance is decreased, the magnetic coupling 110 may be detuned away from a resonant frequency. In order to re-tune the magnetic coupling 110, the capacitance may be increased by switching one or more of the series capacitors 202, 204, 206, and 208 on (i.e. short circuit). Turning on one of the switches 210, 212, 214, or 216 causes the corresponding capacitor to be inactivated and thus serves to electrically remove the corresponding capacitor from the circuit. Reducing the number of active capacitors from the series of capacitors increases the overall capacitance of the series.

As discussed above, re-tuning may include compensating for detuning by generating a reactance shift based on the activation of one or more of the series capacitors 202, 204, 206, and 208 or any combination thereof. Depending on the predetermined selection of series capacitors that are used, a reactance shift having a uniform step size between combinations of series capacitors may be implemented. Specifically, in Equation 1:

$$C_1 = \frac{C_2}{2} = \frac{C_3}{4} = \frac{C_4}{8} = \frac{C_n}{2^{n-1}} = C_t \qquad \text{Eq. 1}$$

In Eq. 1, $C_1$ is the capacitive value of the first series capacitor 202, and $C_2$ is the capacitive value of the second series capacitor 204. Further, $C_3$ is the capacitive value of the third series capacitor 206; $C_4$ is the capacitive value of the fourth series capacitor 208, while $C_t$ is a capacitive value associated with a uniform step size. The capacitors shown in FIG. 1 are to be activated or deactivated in accordance with a predetermined order, such that each activation or deactivation of an additional capacitor changes the overall capacitance of the circuit by a uniform capacitance step. Thus, the reactance shift step size associated with combinations of series capacitors is substantially uniform for each progression of a binary combination of series capacitors in the set. In this case, total reactance created by the tuning circuit illustrated in FIG. 2 may be illustrated in Equation 2:

$$X_C(S_1 S_2 S_3 S_4) = -\frac{j}{\omega}\left(\frac{1}{C_s} + \frac{\overline{S_1}}{C_1} + \frac{\overline{S_2}}{C_2} + \frac{\overline{S_3}}{C_3} + \frac{\overline{S_4}}{C_4} \ldots + \frac{\overline{S_n}}{C_n}\right) \qquad \text{Eq. 2}$$

$$= -\frac{j}{\omega}\left(\frac{1}{C_s} + \frac{2^{n-1}\overline{S_1} + 2^{n-2}\overline{S_2} + 2^{n-3}\overline{S_3} + 2^{n-4}\overline{S_4} \ldots + \overline{S_n}}{2^{n-1}C_t}\right)$$

In Eq. 2, Sn is a binary number indicating the switch state of each switch. Sn=1 represents a closed state of a give switch. Further, $X_c$ is a reactance shift based on capacitive switching of one or more series capacitors 202, 204, 206, and 208. Between adjacent switch states, for example $S_1S_2S_3S_4$ and $S_1S_2S_3S_4+1$, the reactance shift difference introduced by the adaptive tuning network may be a uniform value indicated by Equation 3:

$$X_c = 1/(j\omega 2^{n-1} C_t) \qquad \text{Eq. 3}$$

Further, this adaptive tuning circuit 200 configuration enables the maximum total reactance shift compensation range for a given number of switches. Alternatively, for the same total reactance shift compensation range ($Xc_{total}$) required, a minimum step size can be achieved with this circuit topology, where the minimum step size is indicated by Equation 4:

$$X_{min} = Xc_{total}(2^n - 1) \qquad \text{Eq. 4.}$$

Figure 3:
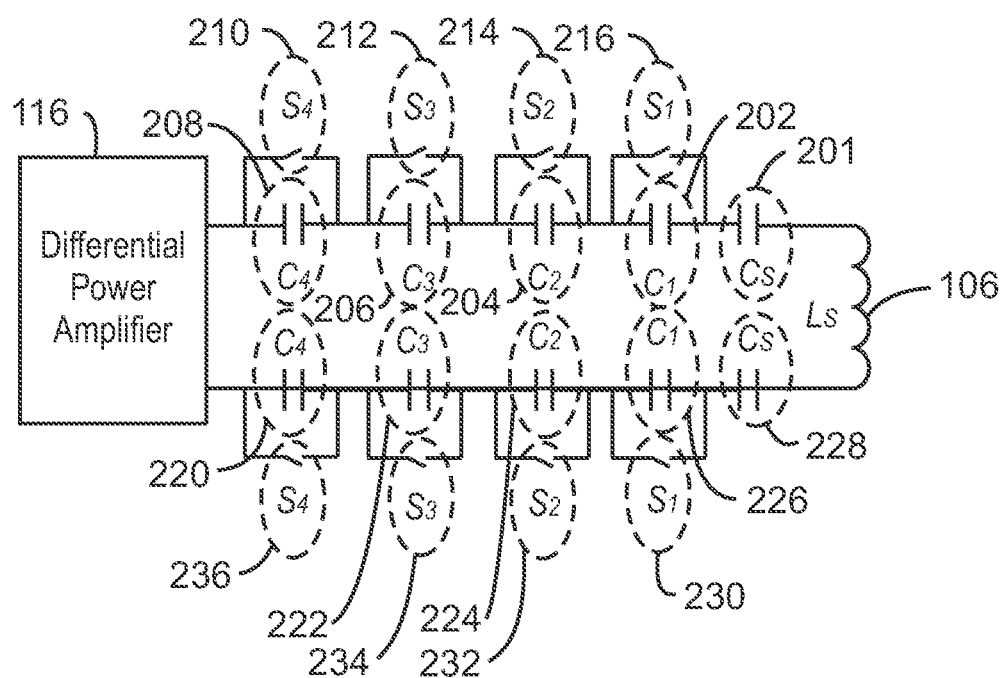
FIG. 3 is a diagram illustrating a differential power amplifier and series tuned capacitors.

FIG. 3 is a diagram illustrating a differential power amplifier and series tuned capacitors. In some cases, the power amplifier 116 may be a differential power amplifier as illustrated in FIG. 3. In this scenario, the differential power amplifier 116 may include two outputs wherein the series tuned capacitors 202, 204, 206, 208 are a first set of series tuned capacitors disposed at a first output of the differential power amplifier 116. A second set of series capacitors including 220, 222, 224, and 226 may be disposed at a second output of the differential power amplifier 116. The second set of series capacitors may be in series with the Tx coil 106 as well as a series capacitor 228 otherwise used for normal operation of the inductive magnetic coupling at a given resonance frequency. The second set of series capacitors including 220, 222, 224, and 226 may be turned on and off by a set of switches including 230, 232, 234, 236.

The second set of capacitors including 220, 222, 224, and 226 may be used to further reduce the granularity of a reactance shift step size. The reactance shift for a given number of capacitor bits "n" using the differential power amplifier 116 is illustrated in Equation 5:

$$X_C(S_1 S_2 S_3 S_4, S_1' S_2' S_3' S_4') = \qquad \text{Eq. 5}$$
$$-\frac{j}{\omega}\left(\frac{1}{C_s} + \frac{2^{n-1}(\overline{S_1} + \overline{S_1'}) + 2^{n-2}(\overline{S_2} + \overline{S_2'}) \ldots + \overline{S_n} + \overline{S_n'}}{2^n C_t}\right)$$

In Eq. 5, $S_1$ correlates with the switch 216, $S_2$ correlates with the switch 214, $S_3$ correlates with the switch 212, and $S_4$ correlates with the switch 210. On the other side of the differential power amplifier 116, $S_1'$ correlates with the switch 230, $S_2'$ correlates with the switch 232, $S_3'$ correlates with the switch 234, and $S_4'$ correlates with the switch 236. If the two sides are switched asynchronously and the difference to one step is limited, for example $|S_1 S_2 S_3 S_4 - S_1' S_2' S_3' S_4'| \leq 1$, the minimum change in reactance shift compensation offered by the adaptive tuning network 300 can be reduced to: $1/(j\omega 2^n C_t)$, or half the step size of the single ended adaptive tuning network 200. A finer step size may offer tighter control of power amplifier 116 performance and better power amplifier 116 efficiency.

Figure 4:
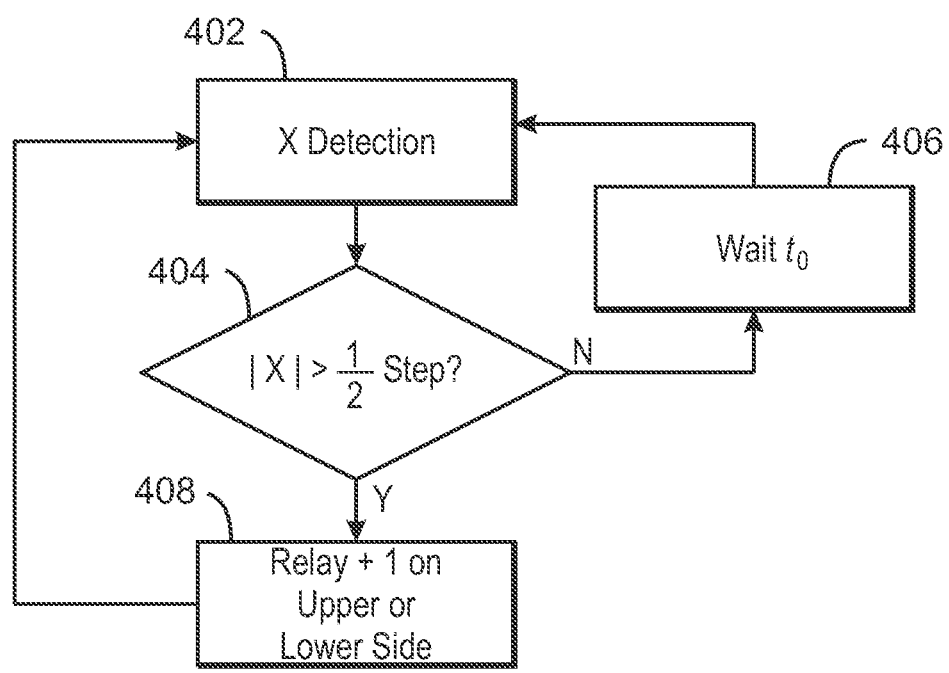
FIG. 4 is a flow chart illustrating using a differential power amplifier configured to increase granularity via series tuned capacitors.

FIG. 4 is a flow chart illustrating using a differential power amplifier configured to increase granularity via series tuned capacitors. At 402, a reactance shift step is detected. At block 404, it is determined if the reactance shift step is greater than ½ of an expected uniform step. If no, then the PTU 102 may wait for a time period, $t_0$, as indicated at 406, and return to the reactance detection at 402. If the reactance shift step is greater than ½ of an expected uniform step, then a progression (+1 or −1) of relay state is initiated, which changes the state of one or more of the relays 230, 232, 234, and 236 of FIG. 3 depending on the status of the relay.

Figure 5:
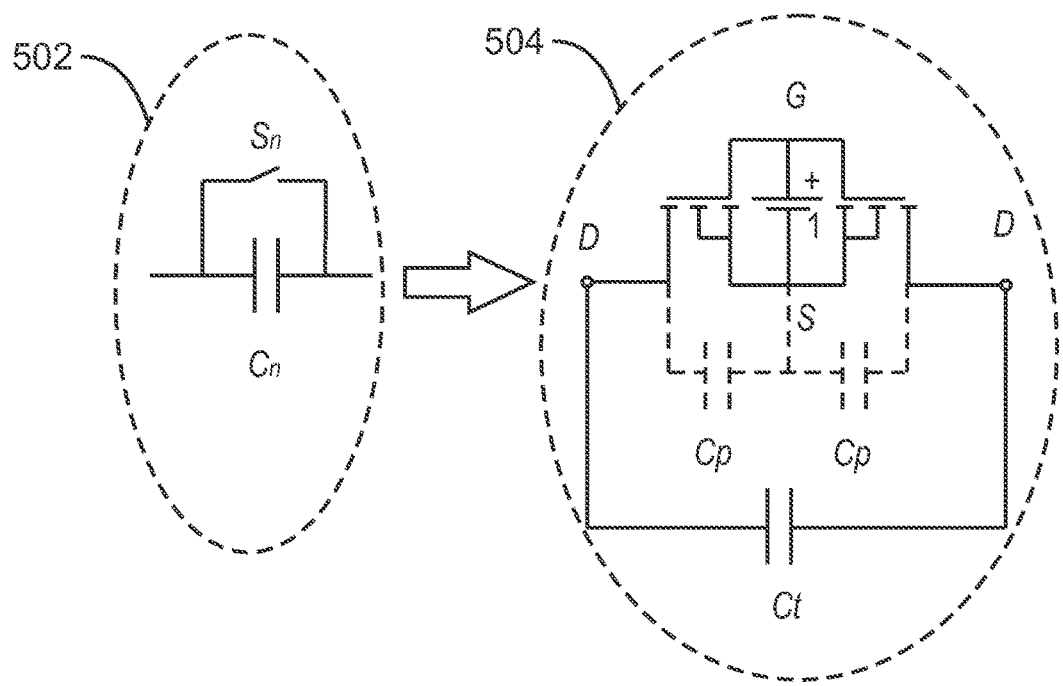
FIG. 5 is a diagram illustrating a series tuned capacitor implemented with a solid state relay.

FIG. 5 is a diagram illustrating a series tuned capacitor implemented with a solid state relay. In some cases, a switch 502, such as one or more of the switches 210, 212, 214, and 216 of the first switch set, or one or more of the switches 230, 232, 234, and 236 of FIG. 2 or FIG. 3, or any combination thereof may be implemented as a solid state relay, generally indicated at 504.

In comparison to a mechanical relay, a solid state relay may have a longer lifetime. For example, a mechanical relay may have a reliable operational range of 100,000 times. In infrastructure employment, 100,000 time operational range may correlate to less than 1 year of usage. In other words, the switch may become a bottleneck of a PTU, such as the PTU 102, lifespan. Therefore, the techniques described herein include implementing one or more solid state relays 504 in one or more of the switches 210, 212, 214, and 216, or 230, 232, 234, and 236 of FIG. 2 or FIG. 3, or any combination thereof.

In some cases, the use of the solid state relay 504 may generate a parasitic capacitance even during an off state. More specifically, some field effect transistors (FETs) implemented in the solid state relay 504 may not be turned off completely due to an output capacitance associated with the solid state relay 504. Therefore, the techniques described herein include absorbing output capacitance of the solid state relay 504 into the tuning capacitance when the relay is off. As the variation in the output capacitance of a given FET in the solid state relay 504 is relatively small compared to the larger tuning capacitance, the absorbed output capacitance may not be significant.

In some cases, the solid state relay 504 may receive a driving signal. The solid state relay 504 may be disposed on a path of high voltage and high current signal, a gate drive of the solid state relay 504 may not be referenced to ground, providing reduction in isolation between the gate drive which is referenced to source and a logic drive which is referenced to ground. Therefore, the techniques described herein include an opto-isolator configured to achieve this function. The output and input signals may be transferred optically, thereby providing electronic isolation between input and output. Thus, the output may be connected to the gate and source of the solid state relay 504, while the input may be driven by a logic signal that is referenced by ground.

Figure 6:
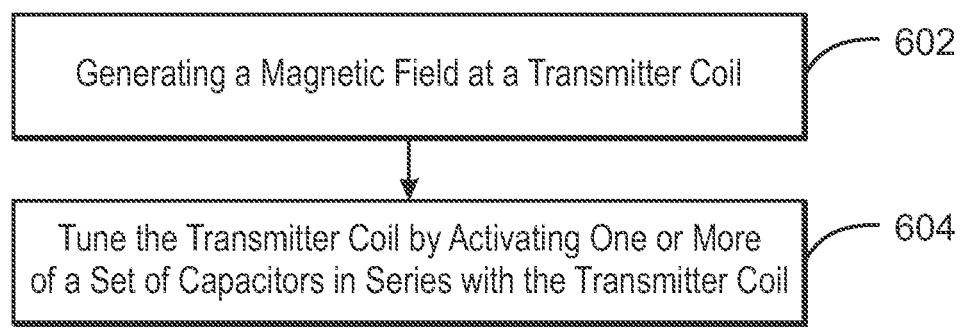
FIG. 6 is a flow chart illustrating a process for tuning in a wireless power transmitter.

FIG. 6 is a flow chart illustrating a process for tuning in a wireless power transmitter. At block 602, the method 600 includes generating a magnetic field at a transmitter coil. At block 604, the method 600 includes tuning the transmitter coil by activating one or more of a set of capacitors in series with the transmitter coil. A capacitance value for each of series capacitors in the set is associated with a reactance shift.

In some cases, the reactance shift associated with each combination of series capacitor is substantially uniform. The method 600 may also include activating one or more series capacitors from among the set of series capacitors via one or more corresponding solid state relays from among a set of solid state relays. Activating the one or more series capacitor may include activating the one or more corresponding solid state relays in parallel to a corresponding capacitor in the set of series capacitors.

Further, in some cases, the method 600 includes exhibiting a parasitic capacitance during an off state of one or more of the solid state relays. In this scenario, the method 600 may include absorbing the parasitic capacitance exhibited by each corresponding solid state relay by each corresponding series capacitor in the set.

The set of series capacitors may include a first set of series capacitors. In this scenario, the method 600 may include providing a first power output to the first set of series capacitors from a differential power amplifier, and selectively providing a second power output to a second set of series capacitors from the differential power amplifier. The method 600 may also include fine tuning the reactance shift associated with each of the series capacitors of the first set via the second set of series capacitors. Fine tuning may include reducing the reactance shift by a half step size.

In some cases, the reactance shift step size associated with combinations of series capacitors is substantially uniform based on characteristics of the set of series capacitors. For example, the method may include activating a first series capacitor associated with a first capacitance value, activating a second series capacitor associated with a second capacitance value substantially equal to twice the first capacitance value, activating a third series capacitor associated with a third capacitance value substantially equal to four times the first capacitance value, activating a fourth series capacitor associated with a fourth capacitance value substantially equal to eight times the first capacitance value, or any combination thereof to achieve uniform step sizes of reactance shift.

EXAMPLES

Example 1 is an apparatus for tuning in a wireless power transmitter. The apparatus includes a transmitter coil configured to generate a magnetic field for wirelessly charging a battery; and a set of capacitors in series with the transmitter coil, the set of capacitors to be activated to retune the transmitter coil in response to detuning caused by the placement of a device over the transmitter coil; wherein a capacitance value for each of the capacitors in the set is associated with a reactance shift.

Example 2 includes the apparatus of example 1, including or excluding optional features. In this example, a reactance shift step size associated with combinations of capacitors is substantially uniform for each progression of a binary combination of capacitors in the set.

Example 3 includes the apparatus of any one of examples 1 to 2, including or excluding optional features. In this example, the apparatus includes a set of solid state relays each configured to activate a corresponding capacitor from among the set of capacitors. Optionally, each solid state relay in the set of solid state relay is parallel to a corresponding capacitor in the set of capacitors. Optionally, each solid state relay is configured to exhibit a parasitic capacitance during an off state. Optionally, each capacitor in the set is configured to absorb the parasitic capacitance exhibited by each corresponding solid state relay.

Example 4 includes the apparatus of any one of examples 1 to 3, including or excluding optional features. In this example, the set of capacitors includes a first set of capacitors. The apparatus further includes: a differential power amplifier including a first output and a second output, wherein the first set of capacitors is disposed at the first output; and a second set of capacitors disposed at the second output. Optionally, the second set of capacitors are configured to reduce the reactance shift difference associated with two of the adjacent combination steps of capacitors of the first set. Optionally, the reduction is a half step size.

Example 5 includes the apparatus of any one of examples 1 to 4, including or excluding optional features. In this example, the set of capacitors includes: a first capacitor associated with a first capacitance value; a second capacitor associated with a second capacitance value substantially equal to twice the first capacitance value; a third capacitor associated with a third capacitance value substantially equal to four times the first capacitance value; and a fourth capacitor associated with a fourth capacitance value substantially equal to eight times the first capacitance value.

Example 6 is a method for tuning in a wireless power transmitter. The method includes generating a magnetic field at a transmitter coil; and tuning the transmitter coil by activating one or more of a set of capacitors in series with the transmitter coil, wherein a capacitance value for each of capacitors in the set is associated with a reactance shift.

Example 7 includes the method of example 6, including or excluding optional features. In this example, a reactance shift difference associated with two adjacent combination steps of capacitors in the set is substantially uniform.

Example 8 includes the method of any one of examples 6 to 7, including or excluding optional features. In this example, the method includes activating one or more capacitors from among the set of capacitors via one or more corresponding solid state relays from among a set of solid state relays. Optionally, activating the one or more capacitor includes activating the one or more corresponding solid state relays in parallel to a corresponding capacitor in the set of capacitors. Optionally, the method includes exhibiting a parasitic capacitance during an off state of one or more of the solid state relays. Optionally, the method includes absorbing the parasitic capacitance exhibited by each corresponding solid state relay by each corresponding capacitor in the set.

Example 9 includes the method of any one of examples 6 to 8, including or excluding optional features. In this example, the set of capacitors includes a first set of capacitors. The method further includes: providing a first power output to the first set of capacitors from a differential power amplifier; and selectively providing a second power output to a second set of capacitors from the differential power amplifier. Optionally, the method includes fine tuning the reactance shift associated with each of the capacitors of the first set via the second set of capacitors. Optionally, fine tuning includes reducing the reactance shift by a half step size.

Example 10 includes the method of any one of examples 6 to 9, including or excluding optional features. In this example, the method includes activating a first capacitor associated with a first capacitance value; activating a second capacitor associated with a second capacitance value substantially equal to twice the first capacitance value; activating a third capacitor associated with a third capacitance value substantially equal to four times the first capacitance value; and activating a fourth capacitor associated with a fourth capacitance value substantially equal to eight times the first capacitance value.

Example 11 is a system for tuning in a wireless power transmitter. The system includes a transmitter coil configured to generate a magnetic field for wirelessly charging a battery; and a set of capacitors in series with the transmitter coil, wherein a capacitance value for each of the capacitors in the set is associated with a reactance shift; and a set of solid state relays each configured to activate a corresponding capacitor from among the set of capacitors to retune the transmitter coil.

Example 12 includes the system of example 11, including or excluding optional features. In this example, a reactance shift difference associated with two adjacent combination steps of capacitors in the set is substantially uniform.

Example 13 includes the system of any one of examples 11 to 12, including or excluding optional features. In this example, each solid state relay in the set of solid state relay is parallel to a corresponding capacitor in the set of capacitors.

Example 14 includes the system of any one of examples 11 to 13, including or excluding optional features. In this example, the set of capacitors includes a first set of capacitors. The system further includes: a differential power amplifier including a first output and a second output, wherein the first set of capacitors is disposed at the first output; a second set of capacitors disposed at the second output.

Example 15 includes the system of any one of examples 11 to 14, including or excluding optional features. In this example, the set of capacitors includes: a first capacitor associated with a first capacitance value; a second capacitor associated with a second capacitance value substantially equal to twice the first capacitance value; a third capacitor associated with a third capacitance value substantially equal to four times the first capacitance value; and a fourth capacitor associated with a fourth capacitance value substantially equal to eight times the first capacitance value.

Example 16 is a wireless power transmitter. The wireless power transmitter includes a transmitter coil to generate a magnetic field for powering an electronic device including a wireless power receiver; a power amplifier to deliver current to the transmitter coil; and a matching network between the power amplifier and the transmitter coil. The matching network includes: a set of capacitors in series with the transmitter coil, the set of capacitors to be activated to retune the transmitter coil in response to detuning caused by the placement of a device over the transmitter coil; wherein a capacitance value for each of the capacitors in the set is associated with a reactance shift.

Example 17 includes the wireless power transmitter of example 16, including or excluding optional features. In this example, a reactance shift step size associated with combinations of capacitors is substantially uniform for each progression of a binary combination of capacitors in the set.

Example 18 includes the wireless power transmitter of any one of examples 16 to 17, including or excluding optional features. In this example, the matching network including a set of solid state relays each configured to activate a corresponding capacitor from among the set of capacitors. Optionally, each solid state relay in the set of solid state relay is parallel to a corresponding capacitor in the set of capacitors. Optionally, each solid state relay is configured to exhibit a parasitic capacitance during an off state. Optionally, each capacitor in the set is configured to absorb the parasitic capacitance exhibited by each corresponding solid state relay.

Example 19 includes the wireless power transmitter of any one of examples 16 to 18, including or excluding optional features. In this example, the set of capacitors includes a first set of capacitors. The wireless power transmitter further includes: a differential power amplifier including a first output and a second output, wherein the first set of capacitors is disposed at the first output; and a second set of capacitors disposed at the second output. Optionally, the second set of capacitors are configured to reduce the reactance shift difference associated with two of the adjacent combination steps of capacitors of the first set. Optionally, the reduction is a half step size.

Example 20 includes the wireless power transmitter of any one of examples 16 to 19, including or excluding optional features. In this example, the set of capacitors includes: a first capacitor associated with a first capacitance value; a second capacitor associated with a second capacitance value substantially equal to twice the first capacitance value; a third capacitor associated with a third capacitance value substantially equal to four times the first capacitance value; and a fourth capacitor associated with a fourth capacitance value substantially equal to eight times the first capacitance value.

Example 21 is an apparatus for wirelessly charging an electronic device. The apparatus includes a means for delivering current to a transmitter coil; and a means for tuning the transmitter coil by activating one or more of a set of capacitors in series with the transmitter coil in response to detuning caused by the placement of the electronic device over the transmitter coil; wherein a capacitance value for each of the capacitors in the set is associated with a reactance shift.

Example 22 includes the apparatus of example 21, including or excluding optional features. In this example, a reactance shift step size associated with combinations of capacitors is substantially uniform for each progression of a binary combination of capacitors in the set.

Example 23 includes the apparatus of any one of examples 21 to 22, including or excluding optional features. In this example, the means for tuning the transmitter coil includes a set of solid state relays each configured to activate a corresponding capacitor from among the set of capacitors. Optionally, each solid state relay in the set of solid state relays is parallel to a corresponding capacitor in the set of capacitors. Optionally, each solid state relay is configured to exhibit a parasitic capacitance during an off state. Optionally, each capacitor in the set is configured to absorb the parasitic capacitance exhibited by each corresponding solid state relay.

Example 24 includes the apparatus of any one of examples 21 to 23, including or excluding optional features. In this example, the set of capacitors includes a first set of capacitors; the means for delivering current to a transmitter coil includes a differential power amplifier including a first output and a second output, wherein the first set of capacitors is disposed at the first output; and the set of capacitors includes a second set of capacitors disposed at the second output. Optionally, the second set of capacitors are configured to reduce the reactance shift difference associated with two of the adjacent combination steps of capacitors of the first set. Optionally, the reduction is a half step size.

Example 25 includes the apparatus of any one of examples 21 to 24, including or excluding optional features. In this example, the set of capacitors includes: a first capacitor associated with a first capacitance value; a second capacitor associated with a second capacitance value substantially equal to twice the first capacitance value; a third capacitor associated with a third capacitance value substantially equal to four times the first capacitance value; and a fourth capacitor associated with a fourth capacitance value substantially equal to eight times the first capacitance value.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for tuning in a wireless power transmitter, comprising:
    a transmitter coil configured to generate a magnetic field for wirelessly charging a battery;
    a differential amplifier to deliver current to the transmitter coil, wherein the differential amplifier comprises a first output and a second output;
    a first set of capacitors arranged in series between the first output and the transmitter coil, and a second set of capacitors arranged in series between the second output and the transmitter coil, the first set of capacitors and the second set of capacitors configured to retune the transmitter coil in response to detuning upon placement of a device over the transmitter coil;
    wherein each capacitor in the first set and the second set is coupled to a parallel switch that causes the capacitor to be short circuited to adjust an overall capacitance of the set;
    wherein a capacitance value for each of the capacitors in the first set and the second set is a fixed capacitance level that provides a uniform reactance shift each time a new combination of capacitors is activated; and
    wherein the first set of capacitors and the second set of capacitors are switched asynchronously with a step difference between the first set of capacitors and the second set of capacitors being less than or equal to one.

2. The apparatus of claim 1, wherein a reactance shift step size associated with combinations of capacitors is substantially uniform for each progression of a binary combination of capacitors in the first set.

3. The apparatus of claim 1, further comprising a set of solid state relays each configured to activate a corresponding capacitor from among the first set of capacitors.

4. The apparatus of claim 3, wherein each solid state relay in the set of solid state relays is parallel to a corresponding capacitor in the first set of capacitors.

5. The apparatus of claim 4, wherein each solid state relay is configured to exhibit a parasitic capacitance during an off state.

6. The apparatus of 5, wherein each capacitor in the first set is configured to absorb the parasitic capacitance exhibited by each corresponding solid state relay.

7. The apparatus of claim 1, wherein the second set of capacitors are configured to reduce the reactance shift difference associated with two of the adjacent combination steps of capacitors of the first set.

8. The apparatus of claim 7, wherein the reduction is a half step size.

9. The apparatus of claim 1, wherein the first set of capacitors comprises:
    a first capacitor associated with a first capacitance value;
    a second capacitor associated with a second capacitance value substantially equal to twice the first capacitance value;
    a third capacitor associated with a third capacitance value substantially equal to four times the first capacitance value; and
    a fourth capacitor associated with a fourth capacitance value substantially equal to eight times the first capacitance value.

10. A method for tuning in a wireless power transmitter, comprising:
    generating a magnetic field at a transmitter coil powered by a differential amplifier comprising a first output and a second output; and
    tuning the transmitter coil by activating one or more of a first set of capacitors arranged in series between the first output and the transmitter coil and a second set of capacitors arranged in series between the second output and the transmitter coil, wherein each capacitor in the first set and the second set is coupled to a parallel switch that causes the capacitor to be short circuited to adjust an overall capacitance of the set; and
    wherein a capacitance value for each of the capacitors in the set is a fixed capacitance level that provides a uniform reactance shift each time a new combination of capacitors is activated; and
    wherein the first set of capacitors and the second set of capacitors are switched asynchronously with a step difference between the first set of capacitors and the second set of capacitors being less than or equal to one.

11. The method of claim 10, wherein a reactance shift difference associated with two adjacent combination steps of capacitors in the first set is substantially uniform.

12. The method of claim 10, further comprising activating one or more capacitors from among the first set of capacitors via one or more corresponding solid state relays from among a set of solid state relays.

13. The method of claim 12, wherein activating the one or more capacitors comprises activating the one or more corresponding solid state relays in parallel to a corresponding capacitor in the first set of capacitors.

14. The method of claim 13, further comprising exhibiting a parasitic capacitance during an off state of one or more of the solid state relays.

15. The method of 14, further comprising absorbing the parasitic capacitance exhibited by each corresponding solid state relay by each corresponding capacitor in the first set.

16. The method of claim 10, further comprising fine tuning the reactance shift associated with each of the capacitors of the first set via the second set of capacitors.

17. The method of claim 16, wherein fine tuning comprises reducing the reactance shift by a half step size.

18. The method of claim 10, comprising:
    activating a first capacitor associated with a first capacitance value;
    activating a second capacitor associated with a second capacitance value substantially equal to twice the first capacitance value;
    activating a third capacitor associated with a third capacitance value substantially equal to four times the first capacitance value; and
    activating a fourth capacitor associated with a fourth capacitance value substantially equal to eight times the first capacitance value.

19. A system for tuning in a wireless power transmitter, comprising:

a transmitter coil configured to generate a magnetic field for wirelessly charging a battery;

a differential amplifier to deliver current to the transmitter coil, wherein the differential amplifier comprises a first output and a second output;

a first set of capacitors arranged in series between the first output and the transmitter coil, and a second set of capacitors arranged in series between the second output and the transmitter coil, wherein a capacitance value for each of the capacitors in the first set and the second set is a fixed capacitance level that provides a uniform reactance shift each time a new combination of capacitors is activated; and a first set of solid state relays each configured to activate a corresponding capacitor from among the first set of capacitors to retune the transmitter coil, and a second set of solid state relays each configured to activate a corresponding capacitor from among the second set of capacitors to retune the transmitter coil, wherein each solid state relay in the first set and the second set of solid state relays is in parallel with a corresponding capacitor in the first set and the second set of capacitors and is configured to short circuit the corresponding capacitor to adjust an overall capacitance of the set of capacitors; and wherein the first set of capacitors and the second set of capacitors are switched asynchronously with a step difference between the first set of capacitors and the second set of capacitors being less than or equal to one.

20. The system of claim 19, wherein a reactance shift difference associated with two adjacent combination steps of capacitors in the first set is substantially uniform.

21. The system of claim 19, wherein each solid state relay in the set of solid state relays is parallel to a corresponding capacitor in the first set of capacitors.

22. The system of claim 19, wherein the first set of capacitors comprises:

a first capacitor associated with a first capacitance value;

a second capacitor associated with a second capacitance value substantially equal to twice the first capacitance value;

a third capacitor associated with a third capacitance value substantially equal to four times the first capacitance value; and a fourth capacitor associated with a fourth capacitance value substantially equal to eight times the first capacitance value.

* * * * *